US007707241B2

(12) United States Patent
Bruekers

(10) Patent No.: US 7,707,241 B2
(45) Date of Patent: Apr. 27, 2010

(54) DETERMINING TYPE OF SIGNAL ENCODER

(75) Inventor: Alphons Antonius Maria Lambertus Bruekers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1497 days.

(21) Appl. No.: 10/521,659

(22) PCT Filed: Jul. 1, 2003

(86) PCT No.: PCT/IB03/03015

§ 371 (c)(1),
(2), (4) Date: Jan. 18, 2005

(87) PCT Pub. No.: WO2004/010352

PCT Pub. Date: Jan. 29, 2004

(65) Prior Publication Data

US 2006/0072378 A1    Apr. 6, 2006

(30) Foreign Application Priority Data

Jul. 22, 2002    (EP) ................... 02077983

(51) Int. Cl.
*G06F 15/16* (2006.01)
*H04L 9/32* (2006.01)
(52) U.S. Cl. .................. 709/203; 713/168; 713/176
(58) Field of Classification Search .................. None
See application file for complete search history.

(56) References Cited

U.S. PATENT DOCUMENTS

| 5,287,374 | A | * | 2/1994 | Parr | 714/774 |
| 5,778,359 | A | * | 7/1998 | Stent | 707/4 |
| 5,918,223 | A | * | 6/1999 | Blum et al. | 707/1 |
| 6,353,666 | B1 | * | 3/2002 | Henderson et al. | 379/229 |
| 6,463,445 | B1 | * | 10/2002 | Suzuki et al. | 707/200 |
| 6,834,308 | B1 | * | 12/2004 | Ikezoye et al. | 709/231 |
| 6,995,309 | B2 | * | 2/2006 | Samadani et al. | 84/603 |
| 7,010,689 | B1 | * | 3/2006 | Matyas et al. | 713/168 |
| 7,081,581 | B2 | * | 7/2006 | Allamanche et al. | 84/616 |
| 7,233,688 | B2 | * | 6/2007 | Ritt et al. | 382/128 |
| 2003/0005301 | A1 | * | 1/2003 | Jutzi et al. | 713/176 |
| 2003/0100299 | A1 | * | 5/2003 | Ko et al. | 455/423 |

OTHER PUBLICATIONS

Haitsma, Jaap, "Robust Audio Hashing for Content Identification", CMBI, 2001.*
Jaap Haitsma, Ton Kalker and Job Oostveen, "Robust Audio Hashing for Content Identification", CBMI 2001, Brescia, Italy.
Job Oostveen, Ton Kalker and Jaap Haitsma, "Visual Hashing of Digital Video: Applications and Techniques", SPIE, Applications of Digital Image Processing XXIV, Jul. 31-Aug. 3, 2001, San Diego, USA.

* cited by examiner

*Primary Examiner*—Ario Etienne
*Assistant Examiner*—Ho Shiu

(57) ABSTRACT

In order to promote its "xxx" signal encoding algorithm, company X offers users of a particular encoder (21) the possibility to up-load (parts of) their .xxx files to the company's website. The company's web-server (1) checks whether the received file is indeed xxx-encoded material by (i) decoding the file using an xxx-decoder (11), (ii) deriving a fingerprint (12) from the decoded signal, and (iii) awarding the owner if the derived fingerprint corresponds to one of the fingerprints stored in X's database (14). A possible award is the transmission, to the user, of metadata associated with the signal such as title, artist, lyrics, etc.

10 Claims, 1 Drawing Sheet

DETERMINING TYPE OF SIGNAL ENCODER

FIELD OF THE INVENTION

The application relates to a method of determining whether an encoded signal has been encoded with a particular type of encoder. The application also relates to a server station being arranged to carry out such a method.

BACKGROUND OF THE INVENTION

Numerous types of encoding algorithms are nowadays used to encode multimedia files. Well known compression formats are "zip" (for data), "mp3", "wma" (for audio), "avi" and "divx" (for movies). The respective encoder removes almost all redundancy, and in case of lossy encoding also the irrelevancy, from the original signal so as to obtain an encoded signal that can more efficiently be stored and/or distributed.

Sometimes it is desired to determine by which type of encoder an encoded signal has been produced, or at least ascertain whether an encoded signal has been produced by a particular type of encoder. Computer file names have an extension (such as zip, .mp3, .avi) for that purpose. Some encoders also render identification possible by adding a header that reveals the necessary information to the contents. However, file name extensions and headers are sometimes missing or cannot be trusted.

Generally, the type of encoding cannot be identified by mere inspection of the encoded signal, because the encoded and compressed contents contain little or no structure. A trivial solution would be to try all possible decoders and interpret their outputs. For audio signals, a human being would have to listen whether the decoder output is music or not. This may be a hard decision for some types of music. Moreover, such a solution requires human interaction and cannot be automated.

OBJECT AND SUMMARY OF THE INVENTION

It is an object of the application to provide an alternative method and arrangement for determining whether an encoded signal has been encoded with a particular type of encoder.

These and other objects are achieved with the method in accordance with the application, which method comprises the steps of: receiving at least a part of said encoded signal; decoding the received signal using a decoder which performs the reverse operation of said particular type of encoder, deriving a fingerprint from the decoded signal; comparing said fingerprint with fingerprints stored in a database; and concluding that the encoded signal has been encoded with said particular type of encoder if the derived fingerprint corresponds to one of the fingerprints stored in the database.

The invention exploits the insight that the structure of encoded material is meaningless to a decoder which is not complementary to the respective encoder. Contents being decoded by the wrong decoder differ significantly from the original contents. It is even unlikely that music or video being reproduced by a wrong decoder resembles any other existing original material. Fingerprints are binary sequences that identify robust perceptual features of contents. If two signals are similar, their respective fingerprints are also similar. If two signals are perceptually different, the respective fingerprints are also different. This property of fingerprints is used by the method in accordance with the invention to determine whether the decoded signal is an original one.

An advantageous application of this method is promotion of a particular signal encoder. In order to promote its 'xxx' signal encoding algorithm, company X offers owners of its xxx-encoder the possibility to upload (parts of) their .xxx files to the company's website. Using the method according to the application, the company's web-server checks whether the received file is indeed xxx-encoded material and in the affirmative case awards the owner. A possible award is the transmission, to the user, of metadata associated with the signal such as title, artist, lyrics, etc.

BRIEF DESCRIPTION OF THE DRAWINGS

These and other aspects of the invention are apparent from and will be elucidated with reference to the embodiment shown in the drawings, in which.

DESCRIPTION OF EMBODIMENTS

Figure 1:
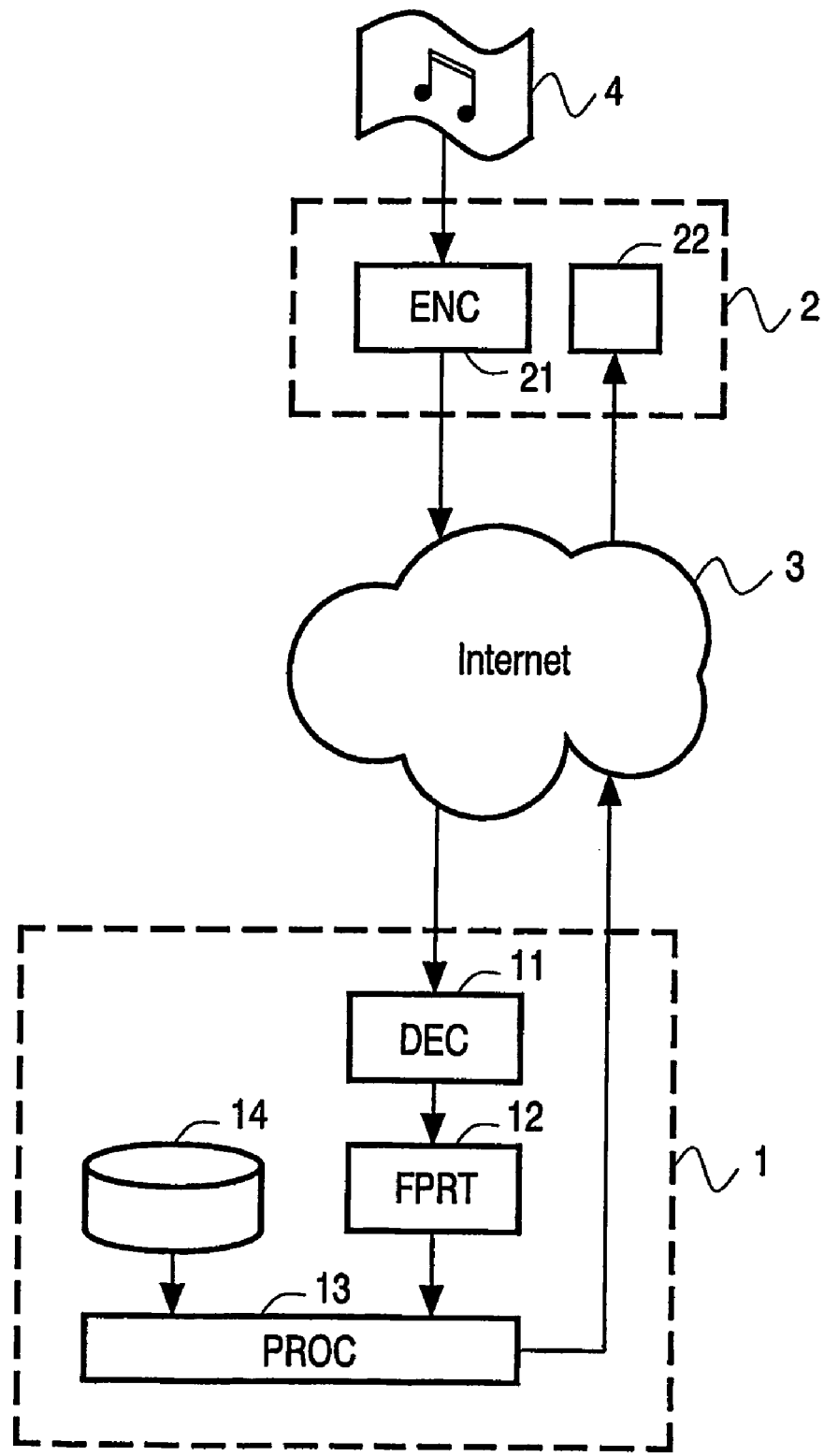
FIG. 1 shows a schematic diagram of a system to illustrate the operation of the method in accordance with the invention.

The invention will be explained with reference to audio signals, but it will be appreciated that the invention is not limited thereto and can equally be applied to video and other types of multimedia signals. FIG. 1 shows a schematic diagram of a system to illustrate the operation of the method in accordance with the invention. The system comprises a server 1 and a client 2 connected together through a network 3.

The client 2, which may in practice take the form of a personal computer, comprises an audio encoder 21 and a return channel input unit 22. The audio encoder may be a software program being downloaded from the server 1. A piece of music 4 being applied to the client is encoded by audio encoder 21. The encoded audio signal is subsequently uploaded to the server 1 through the network.

The server 1 comprises an audio decoder 11, a fingerprint extraction unit 12, a processor 13, and a database 14. In the server, the song being uploaded by the client is decoded by the audio decoder 11. If the encoder 21 being used by the client matches the server's decoder 11, then the decoded signal will be the same as, or at least perceptually resemble, the original piece of music 4. Otherwise, the decoded audio signal will be an undefined creaky noisy sound, because the encoded signal has a structure which is meaningless to a decoder which has not been designed to be the complement of encoder 11.

The decoded audio signal is applied to the fingerprint extraction unit 12. A fingerprint is a bit pattern indicative of robust perceptual features of the audio signal. If two audio signals are perceptually very similar, the respective fingerprints are also similar (but not necessarily identical). A practical embodiment of the fingerprint extraction unit 12 that can be used in the system is described in Jaap Haitsma, Ton Kalker and Job Oostveen, "Robust Audio Hashing for Content Identification", CBMI 2001, Brescia, Italy. For video applications, a practical embodiment is described in Job Oostveen, Ton Kalker and Jaap Haitsma, "Visual Hashing of Digital Video: Applications and Techniques", SPIE, Applications of Digital Image Processing XXIV, Jul. 31-Aug. 3, 2001, San Diego, USA.

The fingerprint extracted from the decoded audio signal is searched in the database 14 by the processor 13. In the database, one or more fingerprints are stored, which have previously been extracted from respective original audio signals. If the extracted fingerprint matches one of the fingerprints stored in the database, then the decoder 11 has apparently indeed decoded an original piece of music. In that case, the processor concludes that encoder 21 of client 2 is indeed the counterpart of the server's decoder 11. An appropriate message is then sent to the client.

If the extracted fingerprint is not found in the database, then either the encoder 21 being used by the client is not the counterpart of decoder 11, or the uploaded piece of music 4 is not stored in the server's database. In the latter case, the server may transmit a message to the client requesting him to upload a particular song or one from a plurality of particular songs.

In a practical embodiment of server 1, the decoding 11, fingerprint extraction 12, and database searching are all performed by the processor 13, which to that end is loaded with an appropriate computer program.

A novel application of this invention is promotion of a particular signal encoder. A company may encourage the public to buy its encoder by awarding the owner for uploading a piece of encoded material to its website. After identifying the origin of the uploaded signal as being encoded by the preferred encoder, the owner can be given rights to access particular information or execute particular processes.

The application can be summarized as follows. In order to promote its "xxx" signal encoding algorithm, company X offers users of a particular encoder (21) the possibility to upload (parts of) their .xxx files to the company's website. The company's web-server (1) checks whether the received file is indeed xxx-encoded material by (i) decoding the file using an xxx-decoder (11), (ii) deriving a fingerprint (12) from the decoded signal, and (iii) awarding the owner if the derived fingerprint corresponds to one of the fingerprints stored in X's database (14). A possible award is the transmission, to the user, of metadata associated with the signal such as title, artist, lyrics, etc.

The invention has been described with reference to the preferred embodiments. Modifications and alterations will occur to others upon a reading and understanding of the preceding detailed description. It is intended that the invention be construed as including all such modifications and alterations insofar as they come within the scope of the appended claims or the equivalents thereof.

The invention claimed is:

1. A method of determining whether an encoded signal has been encoded with a particular type of encoder, the method comprising the steps of:

receiving at least a part of said encoded signal;

decoding the received signal using a decoder which performs the reverse operation of said particular type of encoder to generate a decoded signal;

deriving a fingerprint from the decoded signal;

comparing said fingerprint with one or more fingerprints stored in a database indicative of one or more particular types of encoder;

concluding that the encoded signal has been encoded with said one or more particulars type of encoder if the derived fingerprint corresponds to one of the fingerprints stored in the database;

wherein said steps are performed by a server which receives the encoded signal from a client through a network;

and awarding the client if the server concluded that the received and decoded signal had been encoded with said one or more particular types of encoder.

2. The method as claimed in claim 1, wherein said step of awarding comprises:

retrieving from the database metadata associated with the signal, and transmitting said metadata to the client.

3. A system, comprising a non-transitory, computer readable storage medium, such as a memory, which stores a set of instructions and a processor which executes the set of instructions, the set of instructions being operable to control the processor to:

receive at least a part of said encoded signal from a client through a network;

decode the received signal using a decoder which performs a reverse operation of said particular type of encoder to generate a decoded signal;

derive a fingerprint from the decoded signal;

compare said fingerprint with one or more fingerprints stored in a database of one or more particular type of encoder;

determine whether the encoded signal has been encoded with said particular type of encoder by determining whether the derived fingerprint corresponds to one of the fingerprints stored in the database;

and awarding the client if the received and decoded signal had been encoded with said one or more particular types of encoder.

4. A server configured to receive from a client via a network encoded files encoded by the client using a selected one of plurality of encoding operations, the server comprising:

a decoder configured to perform a decoding operation to decode the encoded files received from the client to generate a decoded file;

a fingerprint extraction unit configured to extract a fingerprint from the decoded file;

a database configured to store one or more fingerprints identifying fingerprints indicative of one or more of the encoding operations; and a processor configured to compare the extracted fingerprint from the decoded file with the one or more fingerprints stored in the database and determine whether the extracted fingerprint corresponds to a selected one of the encoding operations;

wherein in response to the processor concluding that the received encoded files have been encoded using the one or more selected encoding operations, the processor communicates an award to the client.

5. The server as claimed in claim 4, wherein the award includes metadata associated with the encoded file, the metadata being transmitted to the client.

6. The server as claimed in claim 4, wherein in response to the server concluding that the extracted fingerprint was not found in the database, the processor transmits a message to the client.

7. The server as claimed in claim 4, wherein in response to the extracted fingerprint not being stored in the database, the processor sends a request to the client to resend the encoded file.

8. The server as claimed in claim 4, wherein the fingerprint is a bit pattern associated with the encoded files.

9. The server as claimed in claim 4, further including:

a plurality of client encoders; and a network which connects the client encoders and the server.

10. The server as claimed in claim 4, wherein the decoded file is an audio signal and the fingerprint is a bit pattern indicative of features of the audio signal.

* * * * *